2,951,858
11-OXYGENATED 16α-HYDROXY-4-ANDROSTENE-3,17-DIONES AND PROCESS

Arthur R. Hanze, John A. Hogg, and Alan H. Nathan, all of Kalamazoo Township, Kalamazoo County, Mich., assignors to The Upjohn Company, Kalamazoo, Mich., a corporation of Delaware No Drawing. Filed May 4, 1959, Ser. No. 810,579

6 Claims. (Cl. 260—397.45)

The present invention relates to 11-oxygenated 16α-hydroxy-4-androstene-3,17-diones, i.e., 11β,16α-dihydroxy-4-androstene-3,17-dione and 16α-hydroxy-4-androstene-3,11,17-trione, and to the process for the production thereof.

The compounds and process of the present invention are represented by the following formulae:

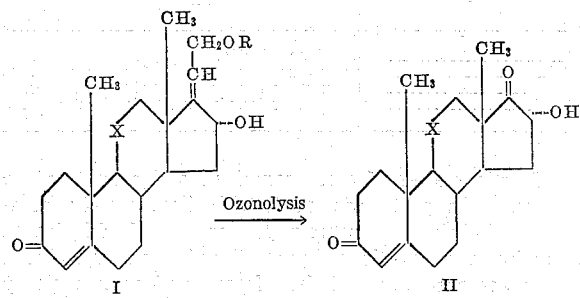

wherein X is selected from the group consisting of the β-hydroxymethylene radical and the corbonyl radical, and R is the acyl radical of an organic carboxylic acid, preferably a hydrocarbon carboxylic acid containing from one to twelve carbon atoms, inclusive.

The novel compounds of the present invention possess central nervous system depressant activity manifested by sedative and hypnotic activity. These compounds are useful in the treatment of neurosis as manifested by hypertension, anxiety, etc., in psychotic conditions where tranquilization is desirable and in related disorders.

The compounds of this invention can be prepared and administered to the animal organism in a wide variety of oral and parenteral dosage forms, singly, or in admixture with other coacting compounds. They can be associated with a carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

The process of the present invention comprises: ozonolyzing (i.e., treating with ozone at low temperature to obtain an ozonide and decomposing the ozonide thus produced, usually by zinc and acetic acid) and 11-oxygenated 16α-hydroxy-21-acyloxy-4,17(20)-pregnadien-3-one to produce the corresponding 11-oxygenated 16α-hydroxy-4-androstene-3,17-dione.

Starting materials for the process of the present invention are 11β,16α-dihydroxy-21-acyloxy-4,17(20)-pregnadien-3-one and 16α-hydroxy-21-acyloxy-4,17(20)-pregnadien-3,11-dione in which the acyl radical is that of an organic carboxylic acid, preferably a hydrocarbon carboxylic acid containing from one to twelve carbon atoms, inclusive, produced as shown in Preparations 1 and 2, the 21-acetates being the preferred starting materials.

According to process of the present invention, ozone is passed into a solution of an 11-oxygenated 16α-hydroxy-21-acyloxy-4,17(20)-pregnadien-3-one at a temperature below approximately thirty degrees centigrade, preferably between approximately minus thirty and approximately minus eighty degrees centigrade, to produce the corresponding 11-oxygenated 16α-hydroxy-21-acyloxy-4,17(20)-pregnadien-3-one 17,20-ozonide.

Representative solvents which can be used for the ozonization include, chloroform, ether, methylene chloride, ethyl acetate, mixtures of these solvents, and the like. The addition of a small amount of pyridine is sometimes advantageous in improving the yield of the 17,20-ozonide. The preferred solvent is chloroform in the presence of a small amount of pyridine.

The 17,20-ozonide, thus obtained, is decomposed by any of the usual decomposition procedures, for example, by reductive decomposition with zinc and a lower organic acid, i.e., formic, acetic, propionic, etc.; by steam distillation; by the addition of an aqueous solution of potassium or sodium bisulfite; and the like, to give the corresponding 11-oxygenated 16α-hydroxy-4-androstene-3,17-dione. Reductive decomposition with zinc and acetic acid is preferred.

The thus obtained 11-oxygenated 16α-hydroxy-4-androstene-3,17-dione is recovered by conventional methods, such as removal of the zinc by filtration and concentration of the reaction mixture by evaporation. The crude 17-keto steroid is then purified by conventional methods such as by chromatography and recrystallization from a suitable solvent, such as, ether, methanol, ethanol, acetone, Skellysolve B hexanes, benzene, ethyl acetate, and the like. Ethyl acetate is the preferred solvent.

The following preparations and examples are illustrative of the process and products of the present invention, but are not to be construed as limiting.

PREPARATION

*11β,16α-dihydroxy - 21 - acetoxy-4,17(20)-pregnadien-3-one*

A mixture of 3.7 g. of 11β-hydroxy-21-acetoxy-4,17(20)-pregnadien-3-one and 1.10 g. of selenium dioxide in 55 ml. of dioxane and 15 ml. of water was heated under reflux for one hour. The solution was filtered to remove the selenium. The filtrate was diluted with water and extracted with methylene chloride. The methylene chloride extractions were combined and concentrated by distillation giving 4.54 g. of a yellow oil. The oil, thus obtained, was dissolved in ethyl acetate and crystallized, yielding 2 g. of 11β,16α-dihydroxy-21-acetoxy-4,17(20)-pregnadien-3-one melting at 172 to 177° C. An analytical sample was prepared by chromatography over alumina (aluminum oxide) followed by recrystallization from ethyl acetate. The analytical sample melted at 179.5 to 181° C.

*Analysis.*—Calc. for $C_{23}H_{32}O_5$: C, 71.10; H, 8.30. Found: C, 71.10; H, 8.14.

In the same manner as described above and substituting other 21-acylates of 11β,21-dihydroxy-4,17(20)-pregnadien-3-one in place of 11β-hydroxy-21-acetoxy-4,17(20)-pregnadien-3-one, the above preparation is productive of other 21-acylates of 11β,16α,21-trihydroxy-4,17(20)-pregnadien-3-one, such as, for example, 11β,16α-dihydroxy-21-propionyloxy-4,17(20)-pregnadien-3-one,
11β,16α - dihydroxy - 21 - butyryloxy - 4,17(20) - pregnadien-3-one, 11β,16α - dihydroxy - 21 - hexanoyloxy - 4,17(20) - pregnadien-3-one,
11β,16α - dihydroxy - 21 - trimethylacetoxy - 4,17(20)-pregnadien-3-one,
11β,16α - dihydroxy - 21 - isovaleryloxy - 4,17(20)-pregnadien-3-one,
11β,16α - dihydroxy - 21 - tertiarybutylacetoxy - 4,17(20-pregnadien-3-one,
11β,16α - dihydroxy - 21 - cyclohexylacetoxy - 4,17(20)-pregnadien-3-one,
11β,16α - dihydroxy - 21 - benzoyloxy - 4,17(20) - pregnadien-3-one,
11β,16α - dihydroxy - 21 - hemisuccinoyloxy - 4,17(20)-pregnadien-3-one,
11β,16α - dihydroxy - 21 - hemiadipyloxy - 4,17(20)-pregnadien-3-one,
11β,16α - dihydroxy - 21 - acrylyoxy - 4,17(20) - pregnadien-3-one,
11β,16α - dihydroxy - 21 undecolyloxy - 4,17(20) - pregnadien - 3 - one,
11β,16α - dihydroxy - 21 - maleyloxy - 4,17(20) - pregnadien-3-one,
11β,16α-dihydroxy - 21 -salicyloyloxy - 4,17(20) - pregnadien-3-one,
11β,16α - dihydroxy - 21 - chloroacetoxy - 4,17(20)-pregnadien-3-one,
11β,16α - dihydroxy - 21 - benzenesulfonyloxy - 4,17(20)-pregnadien-3-one, and the like.

PREPARATION 2

16α-hydroxy-21-acetoxy-4,17(20)-pregnadiene-3,11-dione

A mixture of 14.5 g. of 21-acetoxy-4,17(20)-pregnadiene-3,11-dione, 215 ml. of dioxane, 50 ml. of water and 4 g. of selenium dioxide was heated under reflux for one hour. After cooling the reaction mixture to 26° C., 5.5 g. of Magnesol (synthetic magnesium silicate) was added and the mixture was stirred for 20 minutes. The solids were removed by filtration and the filtrate was diluted with 1 l. of methylene dichloride. The organic solution was washed with water six times. Raney nickel, previously washed with methyl alcohol, was added to the solution and the mixture was stirred for 20 minutes. After filtering through Filter-Cel diatomaceous earth, the solution was dried over sodium sulfate. The solution was then concentrated to dryness and the crude product was recrystallized from ethyl acetate to give crystals of 16α-hydroxy - 21 - acetoxy - 4,17(20)-pregnadiene-3,11-dione melting at 233 to 236° C. and weighing 6.9 g. An analytical sample was prepared by recrystallization from ethyl acetate to give 16α-hydroxy-21-acetoxy-4,17(20)-pregnadiene-3,11-dione melting at 245 to 246° C., $[\alpha]_D$ —145° (chloroform).

Analysis.—Calc. for $C_{23}H_{30}O_5$: C, 71.48; H, 7.82. Found: C, 71.23; H, 7.53.

In the same manner as described above and substituting as starting material other 21-acylates of 21-hydroxy-4,17(20)-pregnadiene-3,11-dione in place of 21-acetoxy-4,17(20)-pregnadiene-3,11-dione, the above preparation is productive of other 21-acylates of 16α,21-dihydroxy-4,17(20)-pregnadiene-3,11-dione, such as, those 21-acylates listed in Preparation 1, for the corresponding 11β-hydroxy compounds, for example, 16α-hydroxy-21-propionyloxy-4,17(20)-pregnadiene-3,11-dione, 16α-hydroxy-21-butyryloxy-4,17(20)-pregnadiene-3,11-dione, and the like.

EXAMPLE 1

11β,16α-dihydroxy-4-androstene-3,17-dione

A solution of 0.513 g. of 11β,16α-dihydroxy-21-acetoxy-4,17(20)-pregnadien-3-one in 25 ml. of methylene chloride and 0.5 ml. of pyridine was cooled in a Dry Ice-acetone bath. Ozone was passed into the solution at a predetermined rate such that in 6.5 minutes 1.56 equivalents had passed through the solution producing the ozonide of 11β,16α - dihydroxy - 21 - acetoxy - 4,17(20)-pregnadien-3-one. By collection of the exit gases in a trap of aqueous potassium iodide and titration of the iodine liberated therein, 0.5 equivalent of ozone was found to have passed through unused, making a net absorption of 1.06 equivalents. Ten milliliters of acetic acid and 0.05 g. of zinc dust were added to the ozonide solution thus produced, and the mixture was stirred for one hour at a temperature ranging from zero to five degrees centigrade and for another hour at about 25 degrees centigrade to decompose the ozonide. The zinc was removed by filtration and the methylene chloride filtrate was washed with water, aqueous sodium bicarbonate solution and dried over magnesium sulfate. The solvent was evaporated, giving 0.434 g. of crude 11β,16α-dihydroxy - 4 - androstene - 3,17-dione. The 11β,16α-dihydroxy-4-androstene-3,17-dione thus produced was chromatographed on 43.0 g. of synthetic magnesium silicate and eluted with 100-ml. fractions as follows:

TABLE I

| Fractions | Solvents |
|---|---|
| 1 | methylene chloride. |
| 2–6 | 5 percent acetone in Skellysolve B hexanes. |
| 7–11 | 10 percent acetone in Skellysolve B hexanes. |
| 12–16 | 20 percent acetone in Skellysolve B hexanes. |

Fractions 9 to 16 were combined and evaporated to dryness, giving 324 mg. of 11β,16α-dihydroxy-4-androstene-3,17-dione. A sample of the 11β,16α-dihydroxy-4-androstene-3,17-dione thus produced was recrystallized from acetone-ether and then from ethyl acetate giving 11β,16α-dihydroxy-4-androstene-3,17-dione melting at 164 to 166° C. and having infrared absorption maxima at 3380, 3260, 1744, 1652, and 1615 reciprocal centimeters. Further recrystallization from ethyl acetate gave crystals of 11β,16α-dihydroxy-4-androstene-3,17-dione melting at 222 to 224° C. Subsequent preparations always gave the higher-melting material, which is the more stable polymorphic crystal form of 11β,16α-dihydroxy-4-androstene-3,17-dione.

Analysis.—Calc. for $C_{19}H_{26}O_4$: C, 71.67; H, 8.23. Found: C, 71.93; H, 8.46.

In the same manner, substituting as starting material other 21 - acylates of 16β,16α,21 - trihydroxy - 4,17(20)-pregnadien-3-one, which can be prepared according to the procedures disclosed in Preparations 1 and 2, in place of 11β,16α - dihydroxy - 21 - acetoxy - 4,17(20)-pregnadien-3-one, the above procedure is productive of 11β,16α-dihydroxy-4-androstene-3,17-dione.

EXAMPLE 2

16α-hydroxy-4-androstene-3,11,17-trione

A stoichiometric equivalent amount of 16α-hydroxy-21-acetoxy-4,17(20) - pregnadiene - 3,11 - dione or other 16α-hydroxy-21-acyloxy-4,17(20)-pregnadiene-3,11-dione is substituted for 11β,16α-dihydroxy-21-acetoxy-4,17(20)-pregnadiene-3-one in the procedure of Example 1, to obtain 16α-hydroxy-4-androstene-3,11,17-trione, a crystalline solid.

It is to be understood that the invention is not to be limited to the exact details of operation or exact materials shown and described, as obvious modifications and equivalents will be apparent to one skilled in the art, and the invention is, therefore, to be limited only by the scope of the appended claims.

We claim:
1. An 11-oxygenated 16α-hydroxy-4-androstene-3,17-dione of the formula:

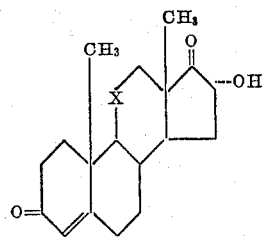

wherein X is selected from the group consisting of the β-hydroxymethylene radical and the carbonyl radical.
2. 11β,16α-dihydroxy-4-androstene-3,17-dione.
3. 16α-hydroxy-4-androstene-3,11,17-trione.
4. The process for the production of 11-oxygenated 16α-hydroxy-4-androstene-3,17-dione which comprises: subjecting 11-oxygenated 16α-hydroxy-21-acyloxy-4,17(20)-pregnadien-3-one 17,20-ozonide to reductive decomposition to produce the corresponding 11-oxygenated 16α-hydroxy-4-androstene-3,17-dione.
5. The process of claim 4 wherein the reductive decomposition is carried out using zinc and a lower organic acid.
6. The process of claim 5 wherein the lower organic acid is acetic acid.

References Cited in the file of this patent
UNITED STATES PATENTS

| | | |
|---|---|---|
| 2,853,502 | Thomas et al. | Sept. 23, 1958 |
| 2,857,403 | Fried | Oct. 21, 1958 |

UNITED STATES PATENT OFFICE

CERTIFICATE OF CORRECTION

Patent No. 2,951,858 — September 6, 1960

Arthur R. Hanze et al.

It is hereby certified that error appears in the printed specification of the above numbered patent requiring correction and that the said Letters Patent should read as corrected below.

Column 1, line 36, for "corbonyl" read -- carbonyl --; column 2, line 16, for "oxonide" read -- ozonide --; column 4, line 51, for "16β,16α,21-" read -- 11β,16α,21- --.

Signed and sealed this 4th day of April 1961.

(SEAL)
Attest: ERNEST W. SWIDER
Attesting Officer

ARTHUR W. CROCKER
Acting Commissioner of Patents